United States Patent [19]
Broker et al.

[11] Patent Number: 6,101,877
[45] Date of Patent: Aug. 15, 2000

[54] ACCELEROMETER MOUNTING

[75] Inventors: John F. Broker; Doug A. Ochsner; John E. Thomas, all of Newton; Evan R. Vande Haar, Pella, all of Iowa

[73] Assignee: Maytag Corporation, Newton, Iowa

[21] Appl. No.: 09/006,917

[22] Filed: Jan. 13, 1998

[51] Int. Cl.[7] ............................. G01P 1/02; G01P 15/09
[52] U.S. Cl. ..................... 73/493; 73/514.34; 310/344
[58] Field of Search ..................... 310/323, 329, 310/344, 348, 352; 361/740, 750, 752; 68/23.1; 73/493, 514.29, 514.34, 514.36

[56] References Cited

U.S. PATENT DOCUMENTS

| | | | |
|---|---|---|---|
| 4,333,029 | 6/1982 | Kolm | 73/514.34 |
| 4,825,696 | 5/1989 | Seipler | 73/493 |
| 5,235,237 | 8/1993 | Leonhardt | 310/329 |
| 5,258,889 | 11/1993 | Belanger, Jr. | 361/740 |
| 5,627,315 | 5/1997 | Figi et al. | 73/514.31 |
| 5,745,347 | 4/1998 | Miller | 73/493 |

*Primary Examiner*—Helen C. Kwok
*Attorney, Agent, or Firm*—Zarley, McKee, Thomte, Voorhees & Sease

[57] ABSTRACT

A mounting device for use with a washing machine to mount a cantilevered piezoelectric film accelerometer to a circuit board. The invention includes a housing structure having a cavity formed therein, with the accelerometer extending inwardly into the cavity from a first wall of the housing structure. The invention also includes a means for flattening the cantilevered piezoelectric film proximate the first wall of the housing structure.

10 Claims, 1 Drawing Sheet

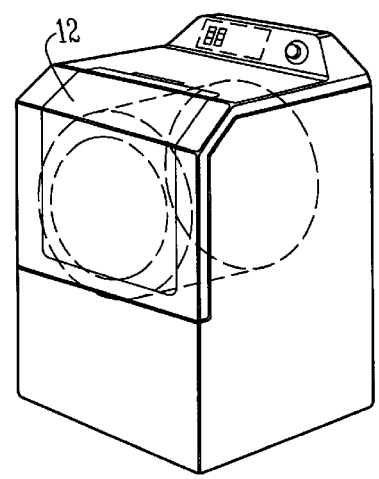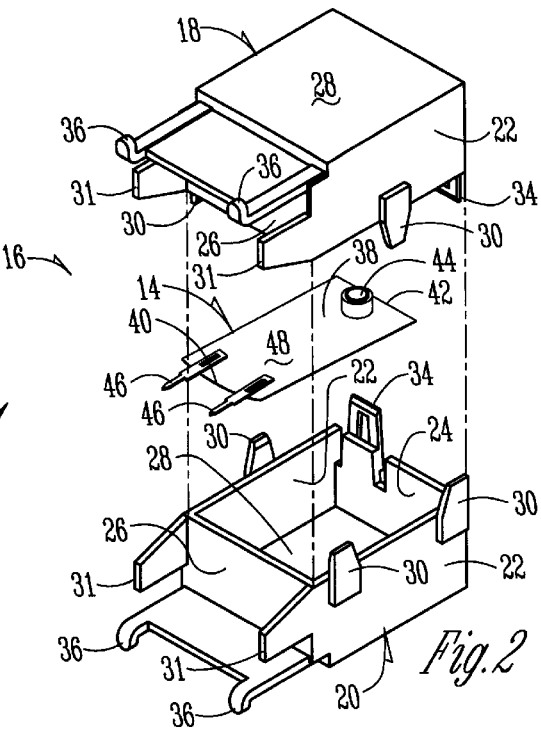

ACCELEROMETER MOUNTING

BACKGROUND OF THE INVENTION

1. Field Of The Invention

The present invention relates to washing machines. More particularly, though not exclusively, the present invention relates to a method and apparatus for mounting an accelerometer in a washing machine for controlling machine vibration.

2. Problems In The Art

Washing machines have an inherent problem in that their dynamic systems rotate at high speeds, often producing excessive machine vibration. The dynamic system of the machine produces vibration which is transferred to the enclosure. This machine vibration typically becomes more problematic as the dynamic system increases rotational speed. For example, an unbalanced, rotating tub of a washing machine transfers the most vibration to the enclosure during the spin cycle.

Some prior art washing machines use an accelerometer to sense machine vibration. The accelerometer can provide feedback to a system that balances the tub to reduce vibration.

One type of accelerometer is made from a strip of piezoelectric film that acts as a cantilevered beam with a weight mounted on one end. The accelerometer converts the flex of the cantilevered beam into an acceleration reading.

One problem with piezoelectric film is that it often has a curvature that gives the beam a certain stiffness. This curvature varies from one piezoelectric film to another, causing a variation in sensitivities to acceleration and vibration. It is desired that the surface of the piezoelectric film remain flat and that the bending occurs in the most active area of the film, thereby improving the sensitivity and consistency of the accelerometer.

3. Features of the Invention

A general feature of the present invention is the provision of a method and apparatus for mounting a cantilevered piezoelectric film accelerometer which overcomes the problems found in the prior art.

A further feature of the present invention is the provision of a method and apparatus for mounting a cantilevered piezoelectric film accelerometer in a washing machine and the like, causing the surface of the piezoelectric film to flatten and thereby improve the sensitivity and consistency of the accelerometer.

A further feature of the present invention is the provision of a method and apparatus for mounting a cantilevered piezoelectric film accelerometer that ensures that the bending of the accelerometer occurs in its most active area, thereby further improving the sensitivity and consistency of the accelerometer.

A further feature of the present invention is the provision of a method and apparatus for mounting a cantilevered piezoelectric film accelerometer that is efficient in operation, economical to manufacture, and durable in use.

These as well as other features, objects, and advantages of the present invention will become apparent from the following specification and claims.

SUMMARY OF THE INVENTION

The mounting device of the present invention is used in a washing machine to mount a cantilevered piezoelectric film accelerometer to a circuit board. The invention is comprised of a housing structure having a cavity formed therein, with the accelerometer extending inwardly into the cavity from a first wall of the housing structure. The invention also includes a means for flattening the top and bottom surfaces of the piezoelectric film proximate the first wall of the housing structure.

The present invention may optionally include a housing structure having a first portion and a second portion adapted to fit in a mating relationship, forming a cavity therein. The rear walls of the first and second portions are suitable for clamping around the piezoelectric film to flatten the top and bottom surfaces.

The present invention also includes a method of flattening a cantilevered piezoelectric film accelerometer to improve its consistency and sensitivity when used with a circuit board. The method generally includes providing a housing structure as described above, positioning the distal end of the accelerometer within the cavity of the housing structure with a portion of the top and bottom surfaces of the piezoelectric film positioned between the rear walls of the housing structure, and coupling the first and second portions of the housing structure together so that the rear walls impart a force normal to the top and bottom surfaces of the piezoelectric film, causing it to flatten.

BRIEF DESCRIPTION OF THE DRAWINGS

FIG. 1 is a perspective view of the washing machine as used with the present invention.

FIG. 2 is an exploded perspective view of the mounting device and accelerometer of the present invention.

FIG. 3 is a perspective view of the mounting device and accelerometer of the present invention with the mounting device in a closed position.

FIG. 4 is a side view of the mounting device and accelerometer of FIG. 2.

FIG. 5 is a side view of the mounting device and accelerometer when mounted to a circuit board.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 is a perspective view of a washing machine 10 of the present invention. The washing machine 10 shown in FIG. 1 is a horizontal axis washing machine. As shown, the washing machine 10 includes a door 12 which provides access to the interior of the washing machine 10. The components of the washing machine 10 shown in FIG. 1 are not a part of the present invention.

FIG. 2 shows the mounting device of the present invention as used with a cantilevered piezoelectric film accelerometer 14. The mounting device includes a housing structure 16 having a first portion 18 and a substantially symmetrical second portion 20. Both the first and second portions (18 and 20) include opposing side walls 22, a front wall 24, a rear wall 26, and an inter-connecting wall 28. The side walls 22 include guide rails 30 that help to couple the first and second portions (18 and 20) together through frictional fits. In addition, each of the front walls 24 includes a lug 32 and a bail 34 for receiving the opposite lug. The bails 34 and lugs 32 constitute another locking mechanism for the mounting device.

Each of the rear walls 26 also includes a pair of legs 36 that can be inserted into a printed circuit board 52 (see FIG. 5) both to secure the housing structure 16 to the mounting board and also to aid in coupling the top and bottom portions (18 and 20) of the housing structure 16. Stabilizing walls 31 abut the circuit board 52 and provide further support.

The housing structure 16 may be made from a variety of materials, although it is preferred that it be integrally formed from a molded plastic.

As shown in FIGS. 2–4, the accelerometer 14 is made from a piezoelectric film 38 having a proximal end 40 and a distal end 42. A weight 44 is attached to the piezoelectric film 38 towards its distal end 42. In this configuration, the piezoelectric film 38 operates like a cantilevered beam and flexes in proportion to acceleration. Because vibration is directly proportional to acceleration, the accelerometer 14 is used to sense vibration. Leads 46 extend from the proximal end 40 of the piezoelectric film 38 for insertion into a circuit board 52.

One characteristic of piezoelectric film is that it often has a slight curvature (see FIG. 2) which may vary from one piezoelectric film to another. This curvature effectively stiffens the piezoelectric film 38. As such, the accelerometer 14 becomes less sensitive and is less able to perceive small amounts and changes of acceleration and vibration. It is therefore preferable that the first and second surfaces 48 and 50 of the piezoelectric film 38 remain flat in order to obtain both high sensitivity and consistency. To this end, the accelerometer 14 is positioned such that the piezoelectric film 38 extends into the cavity formed by the housing structure 16 with the distal end 42 of the accelerometer 14 positioned adjacent the front walls 24 of the first and second portions (18 and 20). A portion of the first and second surfaces 48 and 50 of the piezoelectric film 38 is placed between the rear walls 26 of the first and second portions 18 and 20. When the first and second portions 18 and 20 are coupled together, the rear walls 26 impart a force normal to the first and second surfaces 48 and 50, thereby causing the piezoelectric film 38 to flatten. This also ensures that any bending of the piezoelectric film 38 will occur at the most active area of the film, thereby improving the consistency and sensitivity of the accelerometer 14.

The mounting device of the present invention is easy to use. First, the leads 46 of the accelerometer 14 are inserted into the circuit board 52. Typically, the circuit board 52 will stand vertically within the control panel (not shown), and the accelerometer 14 will extend perpendicular to this vertical plane with the accelerometer 14 allowed to move or bend predominately to the left and right to sense side to side vibrations. Next, the legs 36 of the first and second portions 18 and 20 of the housing structure 16 are inserted into the circuit board 52 at an angle. The first and second portions 18 and 20 are then coupled together in a locked position with the rear walls 26 imparting a force normal to the first and second surfaces 48 and 50 of the piezoelectric film 38, causing the piezoelectric film 38 to flatten. Finally, the leads 46 are soldered to the opposing wall of the circuit board 52.

This method of mounting the accelerometer 14 not only makes it easier to assemble the entire unit to the circuit board 52, but the housing structure 16 also makes an excellent fixture for holding the accelerometer 14 in place while the soldering is accomplished. The housing structure also protects the accelerometer 14 from foreign objects.

The housing structure 16 is not required to enclose the accelerometer 14. Thus, it would be possible for the housing structure 16 to extend far enough from the control board 52 to hold or lock the piezoelectric film 38 without first and second portions 18 and 20 enclosing the piezoelectric film 38.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A mounting device for use with a cantilevered piezoelectric film accelerometer mounted directly to a circuit board and extending generally perpendicular therefrom, said accelerometer having a proximal end, a distal end, a first surface and an opposite second surface, said first and second surfaces extending between said proximal and distal ends, said mounting device comprising:

a housing structure having a first portion and a second portion adapted to fit in a mating relationship, said first and second portions each having a rear wall;

said rear walls of said first and second portions clamping said accelerometer intermediate said proximal and distal ends to flatten said first and second surfaces.

2. The mounting device of claim 1 wherein said first and second portions are symmetrical.

3. The surface conditioning device of claim 2 wherein one of said first and second portions having a lug and the other of said first and second portions having a bail for receiving said lug to couple said first and second portions.

4. The surface conditioning device of claim 1 wherein said housing structure includes a plurality of legs about its periphery for attaching the housing structure to said circuit board.

5. A method of flattening a cantilevered piezoelectric film accelerometer to improve its consistency and sensitivity, said accelerometer having a proximal end, a distal end, electrical leads extending from said proximal end, a first surface and an opposite second surface, said method comprising the steps of: providing a circuit board;

inserting said electrical leads into said circuit board so that said accelerometer extends generally perpendicular from said circuit board;

providing a housing structure having a first portion and a second portion adapted to fit in a mating relationship, said first and second portions each having a rear wall;

clamping said first and second surfaces of the accelerometer between said rear walls of said first and second portions of said housing structure to flatten said first and second surfaces.

6. The method of claim 4 wherein said first and second portions are substantially symmetrical.

7. The method of claim 5 wherein one of said first and second portions having a lug and the other of said first and second portions having a bail for receiving said lug to couple said first and second portions.

8. The method of claim 5 wherein said housing structure includes a plurality of legs about its periphery for attaching the housing structure to said circuit board.

9. The method of claim 8 further comprising the step of inserting said legs into said circuit board.

10. The method of claim 5 further comprising the step of soldering said leads to said circuit board after said first and second portions are coupled together.

* * * * *